United States Patent [19]

Berglund

[11] Patent Number: 4,556,525

[45] Date of Patent: Dec. 3, 1985

[54] METHOD FOR PRODUCING GRANULATE SODIUM TRIPOLYPHOSPHATE OF LOW BULK DENSITY

[75] Inventor: Hans A. L. Berglund, Helsingborg, Sweden

[73] Assignee: Boliden Aktiebolag, Stockholm, Sweden

[21] Appl. No.: 608,098

[22] Filed: May 8, 1984

[30] Foreign Application Priority Data

May 25, 1983 [SE] Sweden .................... 8302943

[51] Int. Cl.⁴ .................... B29C 23/00
[52] U.S. Cl. .................... 264/8; 264/13; 423/315
[58] Field of Search .................... 423/315; 264/8, 13

[56] References Cited

U.S. PATENT DOCUMENTS

| | | | |
|---|---|---|---|
| 3,054,656 | 9/1962 | Cassidy | 423/315 |
| 3,110,559 | 11/1963 | Bigot | 423/315 |
| 3,233,967 | 2/1966 | Slen | 423/315 |
| 3,309,174 | 3/1967 | Pals | 423/315 |
| 3,761,573 | 9/1973 | Hinz et al. | 423/315 |
| 3,993,734 | 11/1976 | Verdier et al. | 423/315 |
| 4,134,963 | 1/1979 | Pals | 423/315 |
| 4,255,274 | 3/1981 | Hensler et al. | 423/315 |
| 4,314,953 | 2/1982 | Knight | 264/13 |
| 4,315,898 | 2/1982 | Lutz | 423/315 |
| 4,391,783 | 7/1983 | Haas et al. | 423/315 |
| 4,454,054 | 6/1984 | Landgräber et al. | 423/315 |

FOREIGN PATENT DOCUMENTS 0059280 9/1982 European Pat. Off. .
2515141 10/1975 Fed. Rep. of Germany .

Primary Examiner—Jeffery Thurlow
Assistant Examiner—Patrick M. Dailey
Attorney, Agent, or Firm—Burns, Doane, Swecker & Mathis

[57] ABSTRACT

The present invention relates to a method for producing lightweight granules of sodium tripolyphosphate from a powderous sodium-phosphate mixture. The material is first processed in the schugi-mixer, while adding a given quantity of water thereto, whereafter the moist mixture is fed to a rotating calcining furnace, to which the given, remaining quantity of water is supplied to the material prior to calcination.

10 Claims, 1 Drawing Figure

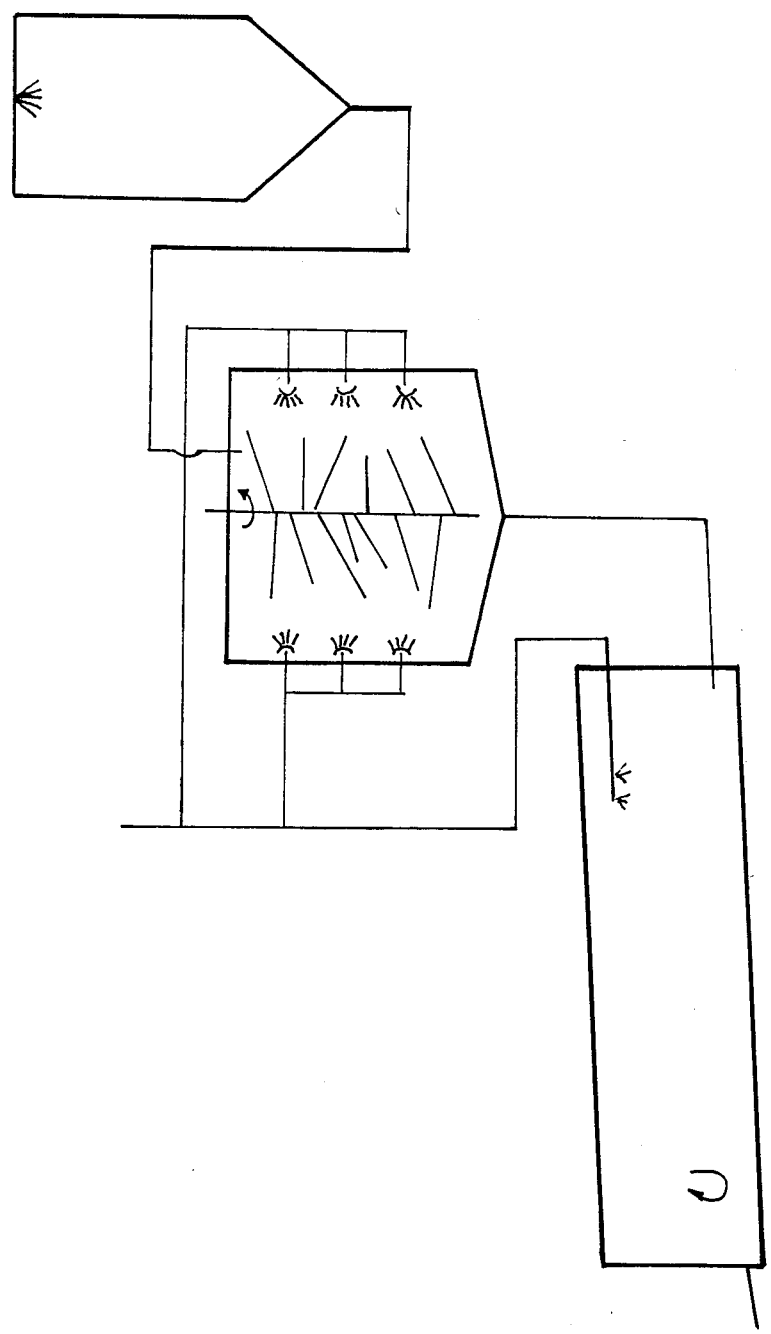

METHOD FOR PRODUCING GRANULATE SODIUM TRIPOLYPHOSPHATE OF LOW BULK DENSITY

TECHNICAL FIELD

The invention relates to a method for producing granulate sodium tripolyphosphate from a powderous sodium-phosphate mixture.

The object of the present invention is to enable the bulk density and particle-size distribution to be controlled when manufacturing granulate sodium tripolyphosphate, particularly so-called lightweight granulate sodium tripolyphosphate.

BACKGROUND ART

When producing lightweight granulate sodium tripolyphosphate, there has hitherto been used a method in which so-called ortomix-powder is added with water (about 10%) in a schugi-mixer through spray nozzles, while vigorously agitating the mixer contents with the aid of knives arranged therein. The powderous product is agglomerated to a certain extent as a result of this mixing process.

The material leaving the schugi-mixer is introduced into a rotating calcining drum (1.5 rpm) in which the water is driven-off at a temperature of about 500° C., thereby to form sodium tripolyphosphate in the form of lightweight granules. The material hitherto obtained has had a bulk entity of 0.25–0.59 kg/l and 42% of the granular material has been found to lie beneath 0.25 mm, when passed through a screen. The ortomix-powder used is prepared by mixing disodium phosphate solution and sodium dihydrophosphate solution in a molar ratio of 2:1, and spray drying the resultant solution to form an ortomix-powder.

The quantity of fine material present can be reduced by increasing the amount of water charged to the schugi by 11–12%, although the bulk density will then exceed permitted specifications and require the schugi to be flushed clean more often than would otherwise be the case.

The lightweight granular sodium tripolyphosphate is admixed with washing-detergent compositions containing additional tensides and carriers. In this respect, it is important that as far as possible all the products used have the same bulk density and particle-size distribution, so as to avoid separation of the products one from the other, i.e. to prevent a product from separating-out in the mixture as a result of vibration and, for example, becoming concentrated in the bottom of the packet containing the composition.

It is readily obvious that a separation of the various constituents, one from the other will negatively affect the quality of the final product and its usefulness. A poor quality can lead to lost markets, which are difficult to recover.

There is consequently a need for a product which is lighter in weight than the known product, and in which the bulk-density ranges are narrower between produced batches, and have a particle-size distribution such that the percentage of particles smaller than 0.25 mm does not exceed 35%.

BRIEF DESCRIPTION OF THE DRAWING

The drawing is a schematic illustration of a plant for carrying out the method of the present invention.

DESCRIPTION OF THE PRESENT INVENTION

It has now surprisingly been found possible to produce such lightweight, granular sodium tripolyphosphate in accordance with the present invention, which is characterized in that the water required to moisten the sodium-phosphate powder mixture is added partially in a schugi-mixer and the remainder e.g., 25–50% of the total amount of water is added in the proximity of the intake of the moist sodium-phosphate powder mixture arriving from the schugi-mixer into a calcining furnace, whereafter the sodium-phosphate powder mixture is calcined in a known manner, to form sodium tripolyphosphate while driving-off the water present.

In more particular aspects of the present invention, the sodium-phosphate powder mixture may be formed, e.g., by spray drying, a sodium-phosphate solution containing $Na_2HPO_4:NaH_2PO_4$ in the ratio of 2:1 and containing 0.5–1% $P_2O_5$. The moistened powder mixture is introduced into a calcining furnace wherein additional water in atomized form is added at a distance from the end at which the mixture is introduced of 1/15–1/5 of the furnace length. While the water is introduced and which the mixture is calcined, the furnace can be rotated at a speed of 1.5–2.5 rpm.

Further characteristic features of the invention are set forth in the following claims.

The invention will now be described in more detail with reference to a number of examples and to the accompanying drawing, which illustrates schematically a plant for carrying out the method.

EXAMPLE 1

A fine-grained sodium-phosphate powderous mixture (OM-powder) was prepared by spray-drying a sodium-phosphate solution having a ratio of 2 mole $Na_2HPO_4$ and 1 mole $NaH_2PO_4$. The OM-powder was introduced into a schugi-mixer, to which water was supplied in an amount of 8.4% calculated on the weight of the OM-powder. The water was supplied through spray nozzles. The mixture was thoroughly agitated in the schugi, with the aid of knife-mixers located therein. The material was then introduced into a rotating furnace (1.5 rpm), to which 3.1% water, calculated on the weight of the OM-powder was added through a spray-die located 1.5 m inside the furnace. The furnace had a diameter of 2.2 mm and a length of 15.0 m. The temperature of the material in the furnace was 510° C., at which temperature the OM-powder was recrystallized to tripolyphosphate, by expulsion of the water, to obtain a high phase I-content. Subsequent to being calcined, the product was screened to eliminate excessively fine and excessively coarse particles. As the material was discharged from the furnace, the material was worn by attrition causing changes in values between the furnace product and the product prior to screening.

The following data, shown in Tables 1 and 2 below, were obtained from a series of runs made to produce lightweight granules of sodium tripolyphosphate with the aid of the aforedescribed method. The data applicable to the mixture obtained when supplying water solely to the schugi is shown first in the tables.

In the vertical columns of Tables 1 and 2, there is respectively set forth: the Test designation; the water content of the ortomix powder as it leaves the Schugi mixer; the particle size distribution of the furnace product before being cooled and sieved; the particle size distribution of the furnace product prior to screening;

the yield of particles in the range of 0.15 to 1 millimeter; the amount of ortomix powder processed in kilograms per hour; the amount of water introduced into the Schugi mixer in liters per hour, the amount of water introduced into the furnace in liters per hour; the bulk density of the product; the particle size distribution of the final product; and the attrition value which is a measure of the strength of the granules with a lower value indicating greater strength.

finished product. The bulk density has also been reduced and primarily stabilized. The yield has also increased from a range of 55–76% to a range of 59–79%, with a uniform yield above 70%, whereas the uniform yield of products produced in accordance with previously known methods was about 61–63%.

I claim:

1. A method for producing low bulk density granulate sodium tripolyphosphate comprising:

TABLE 1

| Test | Schugi-product % H$_2$O | Furnace product | | | Product prior to screening | | | Yield |
|---|---|---|---|---|---|---|---|---|
| | | >1 mm % | 0.15–1 mm % | <0.15 mm % | >1 mm % | 0.15–1 mm % | <0.15 mm % | |
| A | 7.12 | 4.5 | 76.5 | 19 | 3 | 67 | 30 | 67 |
| B | 8.08 | 9 | 76 | 15 | 4.5 | 68 | 27.5 | 68 |
| C | 7.45 | 12.5 | 69.5 | 18 | 12 | 56 | 32 | 56 |
| D | 8.84 | 4 | 73 | 23 | 7 | 61 | 32 | 61 |
| E | 9.03 | 4.5 | 78 | 17.5 | 4 | 63 | 33 | 63 |
| 1 | 8.49 | 4 | 75 | 21 | 8 | 60 | 32 | 60 |
| 2 | 8.52 | 8 | 74 | 18 | 7 | 65 | 28 | 65 |
| 3 | 8.17 | 4 | 82 | 14 | 5.5 | 69.5 | 25 | 69.5 |
| 4 | 7.25 | 5.5 | 80.5 | 14 | 5 | 67 | 28 | 67 |
| 5 | 7.60 | 6.5 | 80 | 13.5 | 8 | 65.5 | 26.5 | 65.5 |
| 6 | 6.82 | 3 | 82.5 | 14.5 | 5 | 69 | 26 | 69 |
| 7 | 7.14 | 4 | 86 | 10 | 5 | 72 | 23 | 72 |
| 8 | 6.83 | 5 | 80.5 | 14.5 | 6 | 65 | 29 | 65 |
| 9 | 7.69 | 4.5 | 81.5 | 14 | 5 | 71.5 | 23.5 | 71.5 |
| 10 | — | 10 | 79 | 11 | 16 | 69 | 15 | 69 |
| 11 | 7.86 | 7 | 81.5 | 11.5 | 11 | 71 | 18 | 71 |
| 12* | 8.03 | 11.5 | 76 | 12.5 | 15 | 68 | 17 | 68 |
| 13 | 8.93 | 7 | 87 | 6 | 8 | 79 | 13 | 79 |
| 14 | 7.70 | 6.5 | 79.5 | 14 | 8 | 74 | 18 | 74 |
| 15 | 7.56 | 5.5 | 82.5 | 12 | 7.5 | 71.5 | 21 | 71.5 |
| 16 | 7.43 | 6.5 | 87 | 6.5 | 7 | 77.5 | 15.5 | 77.5 |
| 17 | 7.76 | 7.0 | 87 | 6 | 13 | 70 | 17 | 70 |
| 18 | 7.80 | 7.0 | 81.5 | 11.5 | 9 | 71.5 | 19.5 | 71.5 |
| 19 | 7.5 | 8.3 | 82.5 | 9 | 9 | 71 | 20 | 71 |

*Tests 12–19 were run at 2 rpm

TABLE 2

| Test | OM—powder kg/h | H$_2$O to Schugi l/h | H$_2$O to Furnace l/h | Product vol. weight kg/l | Product, grain-size distribution | | | | | Attrition value |
|---|---|---|---|---|---|---|---|---|---|---|
| | | | | | >1 mm % | 0.5–1 mm % | 0.25–0.5 mm % | 0.15–0.25 mm % | <0.15 mm % | |
| A | 2000 | 225 | — | 0.486 | 1.5 | 12 | 38 | 40.5 | 8 | 23.2 |
| B | 2100 | 240 | — | 0.546 | 1.0 | 13 | 39.5 | 39 | 7.5 | 16.8 |
| C | 2100 | 210 | — | 0.508 | 4.0 | 17.5 | 40 | 33 | 5.5 | 17.8 |
| D | 2040 | 210 | — | 0.500 | 1.0 | 15.5 | 42 | 34.5 | 7 | 18 |
| E | 2500 | 265 | — | 0.528 | 1.5 | 15.5 | 44 | 31 | 8 | 14 |
| 1 | 2300 | 215 | 70 | 0.475 | 2 | 20.5 | 45.5 | 27 | 5 | 15 |
| 2 | 2300 | 215 | 70 | 0.480 | 1.5 | 19.5 | 46 | 28.5 | 4.5 | 14 |
| 3 | 2500 | 225 | 100 | 0.476 | 2 | 26 | 38 | 28.5 | 5 | 13 |
| 4 | 2500 | 225 | 100 | 0.480 | 4 | 31 | 34 | 27 | 4 | 12 |
| 5 | 2500 | 225 | 100 | 0.482 | 1.5 | 23 | 43 | 27.5 | 4.5 | 14 |
| 6 | 2640 | 230 | 100 | 0.484 | 3 | 29 | 39.5 | 24.5 | 4 | 13 |
| 7 | 2640 | 230 | 100 | 0.486 | 4 | 28.5 | 41.5 | 22.5 | 3.5 | 13 |
| 8 | 2640 | 230 | 100 | 0.470 | 3 | 26 | 38 | 27 | 5 | 13 |
| 9 | 2200 | 210 | 100 | 0.460 | 5 | 38 | 37 | 17 | 3 | 12 |
| 10 | 2500 | 230 | 100 | 0.486 | 5 | 31.5 | 36 | 21.5 | 5 | 12 |
| 11 | 2500 | 240 | 100 | 0.471 | 6.5 | 31.5 | 37.5 | 20.5 | 4 | 10 |
| 12* | 2500 | 235 | 100 | 0.484 | 4 | 30 | 43 | 20 | 2.5 | 11 |
| 13 | 2500 | 235 | 100 | 0.488 | 3 | 21 | 44 | 28.5 | 3.5 | 11 |
| 14 | 2500 | 235 | 100 | 0.482 | 4.5 | 30 | 41 | 20.5 | 3.5 | 11.5 |
| 15 | 2500 | 250 | 100 | 0.488 | 3 | 20 | 43 | 28 | 6 | 12 |
| 16 | 2500 | 250 | 100 | 0.508 | 3.5 | 21.5 | 41.5 | 28 | 5.5 | 11 |
| 17*** | 2500 | 220 | 140 | 0.520 | 8 | 39 | 44.5 | 15 | 1.2 | 8.2 |
| 18 | 2500 | 220 | 140 | 0.512 | 5.5 | 32 | 40 | 19 | 2.5 | 8.7 |
| 19 | 2500 | 220 | 140 | 0.520 | 5 | 33.5 | 41 | 17.5 | 2.0 | 8.5 |
| 20** | 2500 | 220 | 140 | 0.512 | 5 | 31 | 41 | 20 | 3 | 8.8 |

*Tests 12–20 were run at 2 rpm
**Not found in Table 1
***Tests 17–20 were run with about 40% of the total water supplied to the furnace As will be seen from the above, there is obtained by means of the present method a substantial reduction in abrasion and the fraction smaller than 0.25 mm in the (a) forming a moistened powderous sodium-phosphate mixture by adding water to uncalcined sodium-phosphate powder in a mixer;
(b) introducing the moistened mixture into a calcining furnace;
(c) adding additional water to the moistened mixture in the calcining furnace in the vicinity of introduction of the mixture; and
(d) calcining the mixture to form low bulk density sodium tripolyphosphate granules.

2. The method of claim 1 wherein 25–50% of the total water used in the method is added in the calcining furnace.

3. The method of claim 1 wherein the moistened powderous sodium-phosphate mixture is formed from a sodium-phosphate solution containing $Na_2HPO_4:NaH_2PO_4$ in the ratio of 2:1 and containing 0.5–1% $P_2O_5$.

4. The method of claim 1 wherein the water is added to the calcining furnace in atomized form at a distance from the end of the furnace at which the mixture is introduced corresponding to 1/15–1/5 of the furnace length.

5. The method of claim 1 wherein the calcining furnace is rotatable and is rotated at a speed of 1.5–2.5 rpm while adding water thereto and while calcining the mixture.

6. The method of claim 1 wherein the amount of sodium tripolyphosphate granules smaller than 0.25 mm does not exceed 35%.

7. The method of claim 1 wherein the yield of sodium tripolyphosphate granules having a particle size greater than 0.25 mm is greater than 70%.

8. The method of claim 1 wherein the bulk density of the sodium tripolyphosphate granules is in the range of 0.460–0.520 kg/l.

9. A method for producing low bulk density granulate sodium tripolyphosphate comprising:
(a) forming a moistened powderous sodium-phosphate mixture having a moisture content of from 6.82 to 8.93 by weight by adding water to uncalcined sodium-phosphate powder in a mixer;
(b) introducing the moistened mixture into a calcining furnace;
(c) adding additional water to the moistened mixture in the calcining furnace in the vicinity of introduction of the mixture, said additional water being in an amount of 25–50% of the total water used in the method; and
(d) calcining the mixture to form low bulk density sodium tripolyphosphate granules.

10. The method of claim 9 wherein the bulk density of the sodium tripolyphosphate granules is in the range of 0.460–0.520 kg/l.

* * * * *